United States Patent
Wang (10) Patent No.: US 8,284,792 B2
(45) Date of Patent: Oct. 9, 2012

(54) BUFFER MINIMIZATION IN INTERFACE CONTROLLER

(75) Inventor: James Wang, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 829 days.

(21) Appl. No.: 11/756,940

(22) Filed: Jun. 1, 2007

(65) Prior Publication Data

US 2008/0298383 A1   Dec. 4, 2008

(51) Int. Cl.
| | |
|---|---|
| *H04L 12/54* | (2006.01) |
| *H04L 12/28* | (2006.01) |
| *H04L 12/56* | (2006.01) |
| *G06F 3/00* | (2006.01) |
| *G06F 5/00* | (2006.01) |

(52) U.S. Cl. .......... 370/429; 370/412; 370/417; 710/52; 710/56

(58) Field of Classification Search ................ 370/388, 370/465, 351, 469, 442; 711/158; 710/308, 710/305, 113
See application file for complete search history.

(56) References Cited

U.S. PATENT DOCUMENTS

| | | | | |
|---|---|---|---|---|
| 5,249,271 | A * | 9/1993 | Hopkinson et al. | 710/57 |
| 5,331,669 | A * | 7/1994 | Wang et al. | 375/371 |
| 6,088,772 | A * | 7/2000 | Harriman et al. | 711/158 |
| 6,523,098 | B1 * | 2/2003 | Anderson | 711/158 |
| 6,708,282 | B1 * | 3/2004 | McCarthy et al. | 713/400 |
| 7,016,996 | B1 * | 3/2006 | Schober | 710/113 |
| 7,023,841 | B2 * | 4/2006 | Dell et al. | 370/388 |
| 7,054,331 | B1 * | 5/2006 | Susnow et al. | 370/465 |
| 7,136,953 | B1 | 11/2006 | Bisson et al. | |
| 7,174,412 | B2 * | 2/2007 | Lin | 710/316 |
| 7,221,678 | B1 * | 5/2007 | Hughes | 370/412 |
| 7,251,256 | B1 * | 7/2007 | Barry et al. | 370/503 |
| 7,434,114 | B2 * | 10/2008 | Jang et al. | 714/700 |
| 7,558,281 | B2 * | 7/2009 | Dropps et al. | 370/422 |
| 7,930,462 | B2 * | 4/2011 | Wang et al. | 710/307 |
| 2001/0033581 | A1 * | 10/2001 | Kawarai et al. | 370/468 |
| 2002/0138674 | A1 * | 9/2002 | Mann | 710/52 |

(Continued)

OTHER PUBLICATIONS

International Search Report and Written Opinion for PCT/US2008/065553, mailed Jun. 4, 2009.

(Continued)

*Primary Examiner* — Marsha D. Banks Harold
*Assistant Examiner* — Christopher Wyllie
(74) *Attorney, Agent, or Firm* — Lawrence J. Merkel; Meyertons, Hood, Kivlin, Kowert & Goetzel, P.C.

(57) ABSTRACT

In one embodiment, an apparatus comprises serializer/deserializer (SERDES) circuits. Each SERDES circuit is configured to transmit data on a respective lane to which the SERDES circuit is are coupled during use. The apparatus further comprises a transmit pipe coupled to the SERDES circuits. The transmit pipe comprises stages, and each stage is configured to process a maximum bandwidth unit (a maximum width of a port that is configurable on the lanes and smaller than a largest packet transmitted on the ports). In another embodiment, the apparatus comprises a transmit command queue; a transmit scheduler coupled to the transmit command queue; and a storage device coupled to the transmit scheduler that stores a scheduling calendar. The transmit scheduler is configured to schedule maximum bandwidth units for transmission on ports configured over the lanes on which packets are transmitted. The maximum bandwidth unit is smaller than a packet and is a maximum width of a port that is configurable on the lanes. The transmit scheduler is configured to schedule the maximum bandwidth units according to the scheduling calendar.

2 Claims, 7 Drawing Sheets

U.S. PATENT DOCUMENTS

| | | | |
|---|---|---|---|
| 2002/0146034 A1* | 10/2002 | Benayoun et al. | 370/465 |
| 2003/0026287 A1* | 2/2003 | Mullendore et al. | 370/442 |
| 2003/0105607 A1* | 6/2003 | Jones et al. | 702/121 |
| 2003/0110339 A1* | 6/2003 | Calvignac et al. | 710/305 |
| 2003/0217214 A1 | 11/2003 | Calvignac et al. | |
| 2004/0019730 A1 | 1/2004 | Walker et al. | |
| 2005/0018650 A1* | 1/2005 | Dropps et al. | 370/351 |
| 2006/0064531 A1* | 3/2006 | Alston et al. | 710/308 |
| 2006/0092969 A1* | 5/2006 | Susnow et al. | 370/465 |
| 2006/0112210 A1 | 5/2006 | Tseng | |
| 2006/0251120 A1* | 11/2006 | Arimilli et al. | 370/469 |
| 2007/0011368 A1* | 1/2007 | Wang et al. | 710/52 |
| 2007/0268931 A1* | 11/2007 | Shaikli | 370/468 |
| 2008/0300992 A1* | 12/2008 | Wang et al. | 705/16 |

OTHER PUBLICATIONS

Mark Hayter, "Zen and the Art of SOC Design," Microprocessor Summit 2006, Session MPS-960 High End Processors, P.A. Semi, Inc., 14 pages.

James B. Keller, "The PWRficient Processor Family," PA Semi, Oct. 2005, 31 pages.

U.S. Appl. No. 11/756,931, filed Jun. 1, 2007.

* cited by examiner

BUFFER MINIMIZATION IN INTERFACE CONTROLLER

BACKGROUND

1. Field of the Invention

This invention is related to peripheral interfaces and, more particularly, to mechanisms to efficiently implement peripheral interfaces.

2. Description of the Related Art

There are a variety of peripheral interfaces that have been implemented over the years for computing systems. In some cases, proprietary interfaces are used. More commonly, however, standard interfaces are used by both peripheral device manufacturers and system manufacturers. Device manufacturers implement such an interface to broaden the number of system into which a given device may be installed. Similarly, systems manufacturers implement a standard interface to broaden the number of devices that can be installed in a system.

Standards that have been used in personal computer (PC) systems, other computer systems, and electronic systems of various types include the industry standard architecture (ISA) bus, the enhanced ISA (EISA) bus, the peripheral component interconnect (PCI) bus, the universal serial bus (USB), etc. One standard that is currently popular is the PCI Express (PCIe) standard. The PCIe standard combines compatibility with the popular PCI software model with a high speed serial interface.

Because of its popularity, it is desirable to design circuitry that can interface to PCIe. However, providing flexibility in configuring the interface and providing a cost effective, efficient design is challenging.

SUMMARY

In one embodiment, an apparatus comprises a plurality of serializer/deserializer (SERDES) circuits, wherein each SERDES circuit of the plurality of SERDES circuits is configured to transmit data on a respective lane of a plurality of lanes to which the plurality of SERDES circuits are coupled during use. The apparatus further comprises a transmit pipe coupled to the plurality of SERDES circuits. The transmit pipe comprises a plurality of stages, and wherein each stage is configured to process a maximum bandwidth unit, wherein a maximum bandwidth unit is a maximum width of a port that is configurable on the plurality of lanes, and wherein the maximum bandwidth unit is smaller than a largest packet transmitted on the ports.

In another embodiment, an apparatus comprises a transmit command queue; a transmit scheduler coupled to the transmit command queue; and a storage device coupled to the transmit scheduler. The storage device is configured to store a scheduling calendar, and the transmit scheduler is configured to schedule maximum bandwidth units for transmission on a plurality of ports configured over a plurality of lanes on which packets are transmitted. The maximum bandwidth unit is smaller than a largest packet and is a maximum width of a port that is configurable on the plurality of lanes. The transmit scheduler is configured to schedule the maximum bandwidth units according to the scheduling calendar.

In an embodiment, a method comprises transmitting maximum bandwidth units into a transmit pipe that comprises a plurality of stages, wherein each stage is configured to process a maximum bandwidth unit, wherein a maximum bandwidth unit is a maximum width of a port that is configurable on a plurality of lanes, and wherein the maximum bandwidth unit is smaller than a largest packet transmitted on the ports; and transmitting the maximum bandwidth units exiting the transmit pipe on corresponding one or more lanes of the plurality of lanes that are mapped to a port over which the unit is to be transmitted.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview

Figure 1:
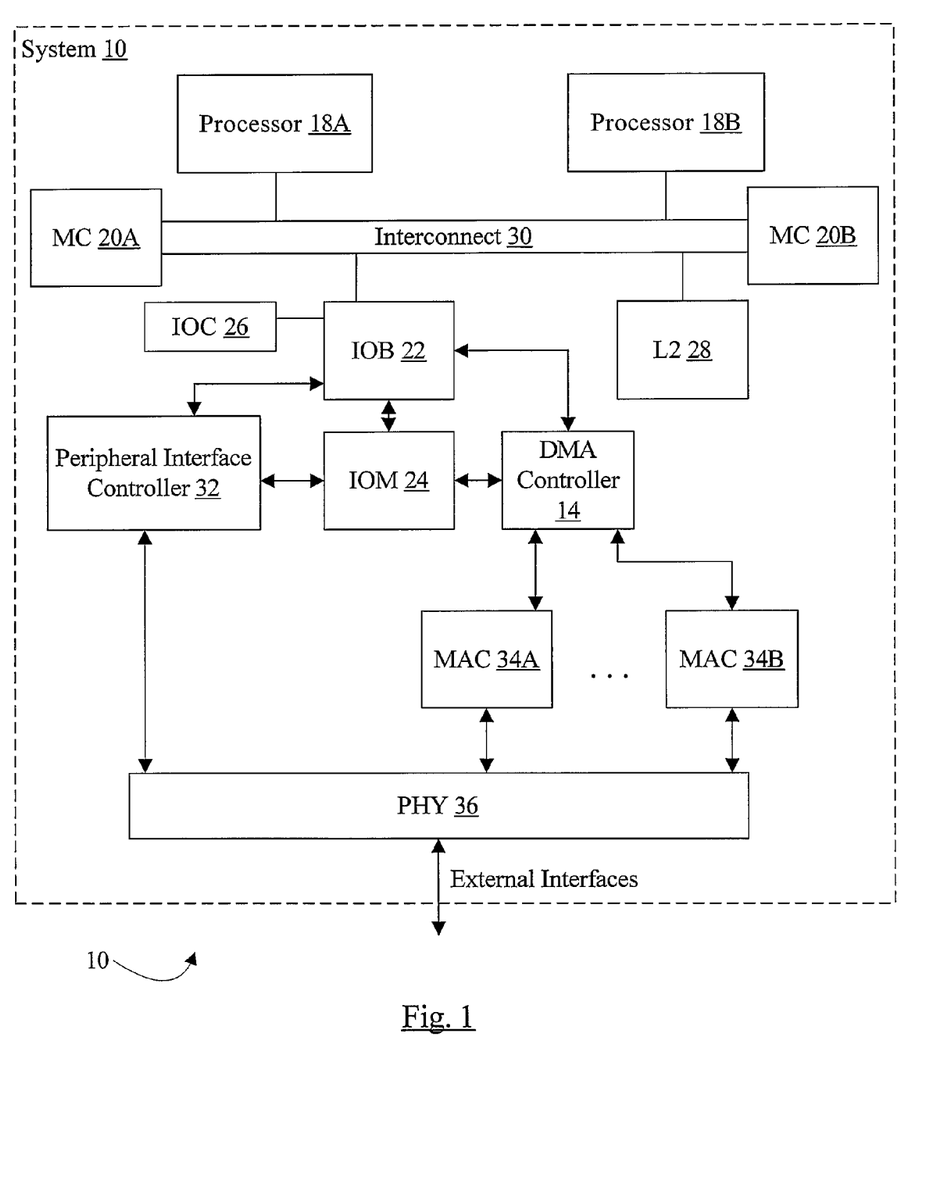
FIG. 1 is a block diagram of one embodiment of a system.

Turning now to FIG. 1, a block diagram of one embodiment of a system 10 is shown. In the illustrated embodiment, the system 10 includes a DMA controller 14, one or more processors such as processors 18A-18B, one or more memory controllers such as memory controllers 20A-20B, an I/O bridge (IOB) 22, an I/O memory (IOM) 24, an I/O cache (IOC) 26, a level 2 (L2) cache 28, an interconnect 30, a peripheral interface controller 32, one or more media access control circuits (MACs) such as MACs 34A-34B, and a physical interface layer (PHY) 36.

The processors 18A-18B, memory controllers 20A-20B, IOB 22, and L2 cache 28 are coupled to the interconnect 30. The IOB 22 is further coupled to the IOC 26 and the IOM 24. The DMA controller 14 is also coupled to the IOB 22 and the IOM 24. The MACs 34A-34B are coupled to the DMA controller 14 and to the physical interface layer 36. The peripheral interface controller 32 is also coupled to the I/O bridge 22 and the I/O memory 34 and to the physical interface layer 36. In some embodiments, the components of the system 10 may be integrated onto a single integrated circuit as a system on a chip. In other embodiments, the system 10 may be implemented as two or more integrated circuits.

The system 10 is one embodiment of a system that may implement the peripheral interface controller 32. Numerous other embodiments are possible and contemplated. For example, an embodiment in which the peripheral interface controller 32 is coupled to the interconnect 30, or is part of a bus bridge to the interconnect 30, is contemplated. Embodiments in which the peripheral interface controller 32 is a standalone integrated circuit are contemplated, as are embodiments employing any level of integration with other system components.

The DMA controller 14 is configured to perform DMA transfers between the interface circuits 16 and the host address space. Additionally, the DMA controller 14 may, in some embodiments, be configured to perform DMA transfers between sets of memory locations within the address space (referred to as a "copy DMA transfer").

The DMA controller 14 may also be configured to perform one or more operations (or "functions") on the DMA data as the DMA data is being transferred, in some embodiments. In one embodiment, some of the operations that the DMA controller 14 performs are operations on packet data (e.g. encryption/decryption, cyclical redundancy check (CRC) generation or checking, checksum generation or checking, etc.). The operations may also include an exclusive OR (XOR) operation, which may be used for redundant array of inexpensive disks (RAID) processing, for example.

The processors 18A-18B comprise circuitry to execute instructions defined in an instruction set architecture implemented by the processors 18A-18B. Specifically, one or more programs comprising the instructions may be executed by the processors 18A-18B. Any instruction set architecture may be implemented in various embodiments. For example, the PowerPC™ instruction set architecture may be implemented. Other exemplary instruction set architectures may include the ARM™ instruction set, the MIPS™ instruction set, the SPARC™ instruction set, the x86 instruction set (also referred to as IA-32), the IA-64 instruction set, etc.

The memory controllers 20A-20B comprise circuitry configured to interface to memory. For example, the memory controllers 20A-20B may be configured to interface to dynamic random access memory (DRAM) such as synchronous DRAM (SDRAM), double data rate (DDR) SDRAM, DDR2 SDRAM, Rambus DRAM (RDRAM), etc. The memory controllers 20A-20B may receive read and write transactions for the memory to which they are coupled from the interconnect 30, and may perform the read/write operations to the memory.

The L2 cache 28 may comprise a cache memory configured to cache copies of data corresponding to various memory locations in the memories to which the memory controllers 20A-20B are coupled, for low latency access by the processors 18A-18B and/or other agents on the interconnect 30. The L2 cache 28 may comprise any capacity and configuration (e.g. direct mapped, set associative, etc.).

The IOB 22 comprises circuitry configured to communicate transactions on the interconnect 30 on behalf of the DMA controller 14 and the peripheral interface controller 32. The interconnect 30 may support cache coherency, and the IOB 22 may participate in the coherency and ensure coherency of transactions initiated by the IOB 22. In the illustrated embodiment, the IOB 22 employs the IOC 26 to cache recent transactions initiated by the IOB 22. The IOC 26 may have any capacity and configuration, in various embodiments, and may be coherent. The IOC 26 may be used, e.g., to cache blocks of data which are only partially updated due to reads/writes generated by the DMA controller 14 and the peripheral interface controller 32. Using the IOC 26, read-modify-write sequences may be avoided on the interconnect 30, in some cases. Additionally, transactions on the interconnect 30 may be avoided for a cache hit in the IOC 26 for a read/write generated by the DMA controller 14 or the peripheral interface controller 32 if the IOC 26 has sufficient ownership of the cache block to complete the read/write. Other embodiments may not include the IOC 26.

The IOM 24 may be used as a staging buffer for data being transferred between the IOB 22 and the peripheral interface controller 32 or the DMA controller 14. Thus, the data path between the IOB 22 and the DMA controller 14/peripheral interface controller 32 may be through the IOM 24. The control path (including read/write requests, addresses in the host address space associated with the requests, etc.) may be between the IOB 22 and the DMA controller 14/peripheral interface controller 32 directly. The IOM 24 may not be included in other embodiments.

The interconnect 30 may comprise any communication medium for communicating among the processors 18A-18B, the memory controllers 20A-20B, the L2 cache 28, and the IOB 22. For example, the interconnect 30 may be a bus with coherency support. The interconnect 30 may alternatively be a point-to-point interconnect between the above agents, a packet-based interconnect, or any other interconnect. The interconnect may be coherent, and the protocol for supporting coherency may vary depending on the interconnect type.

The MACs 34A-34B may comprise circuitry implementing the media access controller functionality defined for network interfaces. For example, one or more of the MACs 34A-34B may implement the Gigabit Ethernet standard. One or more of the MACs 34A-34B may implement the 10 Gigabit Ethernet Attachment Unit Interface (XAUI) standard. Other embodiments may implement other Ethernet standards, such as the 10 Megabit or 100 Megabit standards, or any other network standard. In one implementation, there are 6 MACs, 4 of which are Gigabit Ethernet MACs and 2 of which are XAUI MACs. Other embodiments may have more or fewer MACs, and any mix of MAC types.

Among other things, the MACs 34A-34B that implement Ethernet standards may strip off the inter-frame gap (IFG), the preamble, and the start of frame delimiter (SFD) from received packets and may provide the remaining packet data to the DMA controller 14 for DMA to memory. The MACs 34A-34D may be configured to insert the IFG, preamble, and SFD for packets received from the DMA controller 14 as a transmit DMA transfer, and may transmit the packets to the PHY 36 for transmission.

The peripheral interface controller 32 comprises circuitry configured to control a peripheral interface. In one embodiment, the peripheral interface controller 32 may control a peripheral component interconnect (PCI) Express interface. Other embodiments may implement other peripheral interfaces (e.g. PCI, PCI-X, universal serial bus (USB), etc.) in addition to or instead of the PCI Express interface.

The PHY 36 may generally comprise the circuitry configured to physically communicate on the external interfaces to the system 10 under the control of the interface circuits 16. In one particular embodiment, the PHY 36 may comprise a set of serializer/deserializer (SERDES) circuits that may be configured for use as PCI Express lanes or as Ethernet connections. The PHY 36 may include the circuitry that performs 8$b$/10$b$ encoding/decoding for transmission through the SERDES and synchronization first-in, first-out (FIFO) buffers, and also the circuitry that logically configures the SERDES links for use as PCI Express or Ethernet communication links. In one implementation, the PHY may comprise 24 SERDES that can be configured as PCI Express lanes or Ethernet connections. Any desired number of SERDES may be configured as PCI Express and any desired number may be configured as Ethernet connections.

It is noted that, in various embodiments, the system 10 may include one or any number of any of the elements shown in FIG. 1 (e.g. processors, memory controllers, caches, I/O bridges, DMA controllers, and/or interface circuits, etc.).

Receive Pipes

In some embodiments described in more detail below, a PCIe embodiment of the peripheral interface controller is described. Other embodiments may employ any peripheral interface that can be configured into multiple ports over the physical transmission interface. In one embodiment, the interface may comprise one or more lanes, where a lane is a serial interface. For example, in PCIe, each lane may comprise a transmit and a receive serial transmission. A port may be configured over one or more lanes, and may used the lanes for communicating with a device or devices connected to that port. Thus, ports may reflect which lanes are connected to which devices in an overall system that includes the system 10. Transmissions on the lanes of a port are part of the same overall communication between the system 10 and one or more other devices. As mentioned, lanes may be ganged together to create wider ports. When lanes are ganged together, consecutive bytes transmitted over the port may be transmitted in parallel on each lane. For example, a two lane port may transmit an initial byte on one lane, the next byte on the other lane in parallel, the third byte on the first lane subsequent to the initial byte, etc.). The number of lanes over which a port is configured may be referred to as the "width" of the port, or the "size" of the port. The transmitted bytes may be in the form of packets, where the packet format depends on the underlying protocol.

Figure 2:
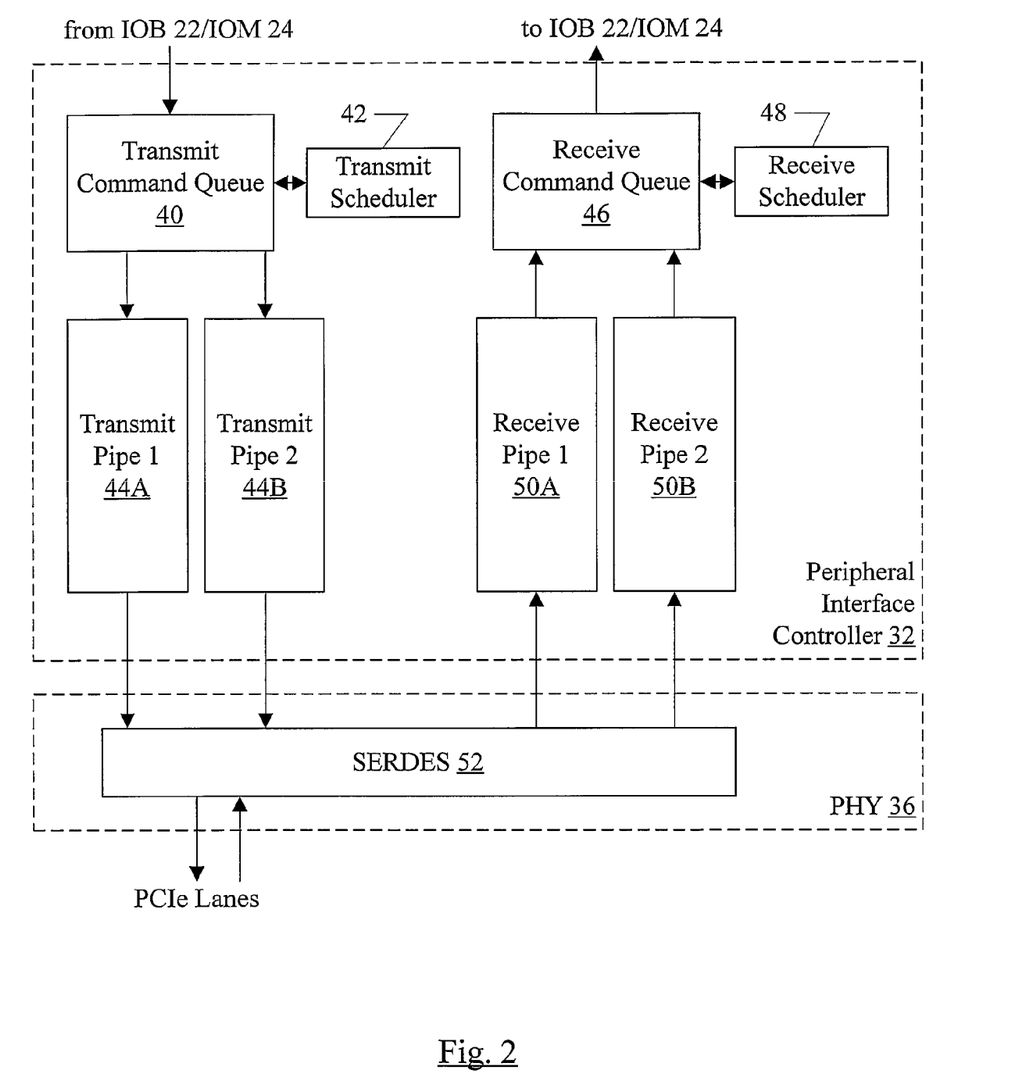
FIG. 2 is a block diagram of one embodiment of a peripheral interface controller and a physical interface layer shown in FIG. 1.

Turning now to FIG. 2, a block diagram of one embodiment of the peripheral interface controller 32 and the PHY 36 is shown in greater detail. Particularly, in the illustrated embodiment, the peripheral interface controller 32 includes a transmit command queue 40, a transmit scheduler 42, a pair of transmit pipelines (pipes) 44A-44B, a receive command queue 46, a receive scheduler 48, and a pair of receive pipes 50A-50B. The PHY 36 includes SERDES circuits 52. The transmit command queue 40 is coupled to receive PCIe packets from the IOB 22/IOM 24 and is coupled to the transmit scheduler 42. The transmit command queue 40 is coupled to the transmit pipes 44A-44B, which are coupled to the SERDES circuits 52. The SERDES circuits 52 are coupled to the PCIe lanes supported by the PHY 36. The SERDES circuits 52 are further coupled to the receive pipes 50A-50B. The receive pipes 50A-50B are coupled to the receive command queue 46, which is further coupled to the receive scheduler 48 and the IOB 22/IOM 24.

In the illustrated embodiment, the peripheral interface controller 32 includes two pipes in each direction. The two pipes in a given direction may be independent of each other, and each pipe may support one or more ports (that are independent of ports on the other pipe). Other embodiments may implement one pipeline in each direction, or more than two, as desired. In one embodiment, each pipe may support up to 4 ports over 16 lanes. The transmit pipe 44A may correspond to the receive pipe 50A, having the same port configuration over the same lanes. Similarly, the transmit pipe 44B may correspond to the receive pipe 50B.

The transmit command queue 40 may receive packets from the IOB 22/IOM 24 to be transmitted on the PCIe interface. The packets may identify the port (and the command type), and the transmit command queue 40 may queue the packets for transmission. For example, the transmit command queue 40 may comprise multiple queues for different command types and ports. Alternatively, the transmit command queue 40 may be programmably divided into sections for used by different command types/ports. In another alternative, command types/ports may be intermixed in the transmit command queue 40, with a certain number of entries reserved for each command type/port. The transmit scheduler 42 may schedule packets for transmission based on the availability of resources in the transmit pipe 44A or 44B (depending on which port that the packet is directed to), flow control credits available at the receiver, etc. The scheduled packet is processed through the transmit pipe 44A or 44B, which may implement various PCIe processing on the packet to prepare the data for transmission on the lanes (e.g. the transaction layer processing, the data link layer processing, and the physical layer processing). The transmit queue 40 may have any number of entries in various embodiments, where each entry may be allocated to a different packet.

The receive command queue 46 may receive packets from the receive pipes 50A-50B, and the receive scheduler 48 may schedule the packets to be delivered to the IOB 22/IOM 24. Receive scheduling may be based on requests from the IOB 22, a credit-based approach, or may use DMA assistance from the DMA controller 14. Similar to the transmit command queue 40, the receive command queue 46, in various embodiments, may comprise multiple queues for different command types and ports, may be programmably divided into sections for used by different command types/ports, or may intermix received packets in the receive command queue 46, with a certain number of entries reserved for each command type/port. The receive command queue 46 may also have any number of entries.

Figure 3:
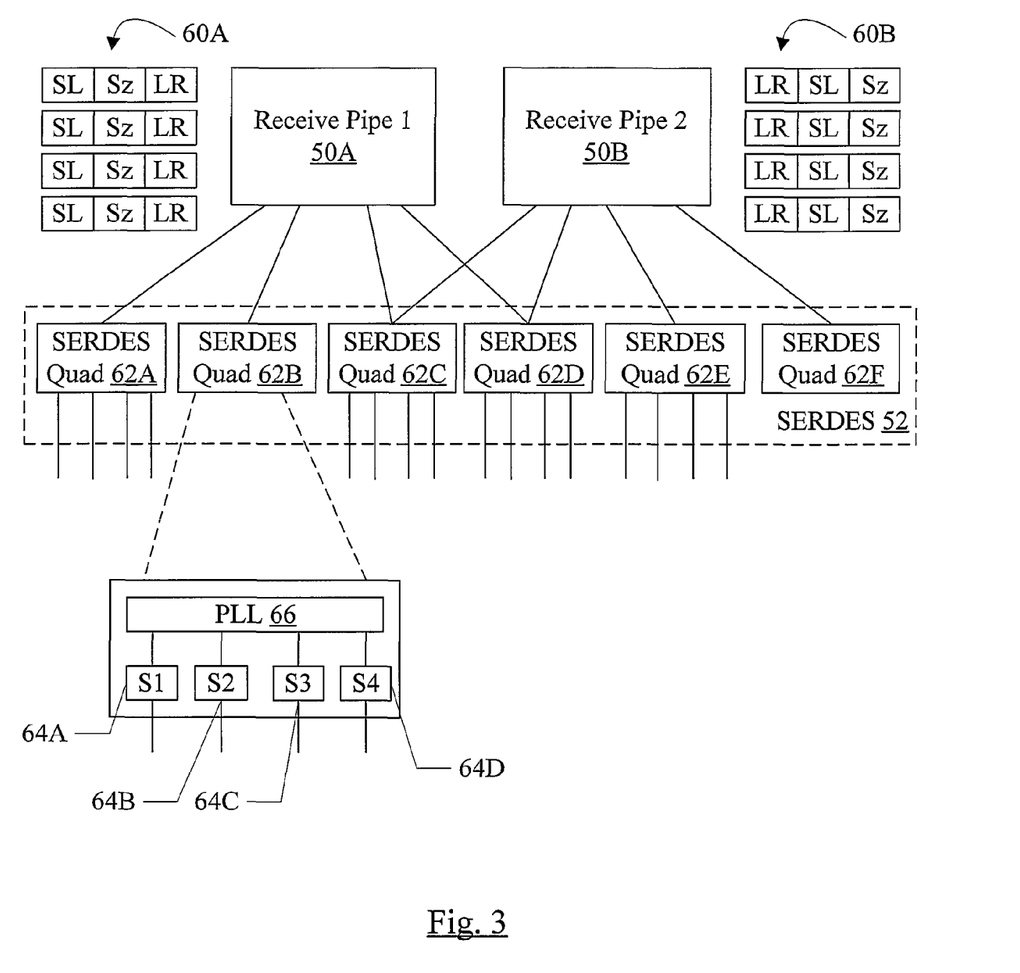
FIG. 3 is a block diagram of one embodiment a receive portion of the peripheral interface controller and the physical interface layer shown in FIG. 2.

Turning now to FIG. 3, a block diagram of one embodiment of a receive portion of the peripheral interface controller 32 and the physical interface layer shown in FIG. 2 is shown in more detail. In the illustrated embodiment, the receive pipes 50A and 50B are shown, as are the SERDES circuits 52. A set of configuration registers are illustrated for each receive pipe (reference numerals 60A-60B). The configuration registers 60A may be coupled to (or part of) the respective receive pipe 50A-50B. The SERDES circuits 52 are divided into a set of SERDES quads 62A-62F. The SERDES quad 62B is shown in exploded view, and includes 4 SERDES 64A-64D and a PLL 66 coupled to the SERDES 64A-64D. Each SERDES 64A-64D is coupled to a PCIe lane. Each SERDES quad 62A-62F is coupled to one or both of the receive pipes 50A-50B. Specifically, the SERDES quads 62A-62B are dedicated to the receive pipe 50A (and thus are coupled only to the receive pipe 50A and not to the receive pipe 50B and the SERDES quads 62E-62F are dedicated to the receive pipe 50B. The SERDES quads 62C-62D are shared between the receive pipes 50A-50B, and thus are shown coupled to both pipes 50A-50B. Accordingly, either pipe's ports may be configured over up to 16 lanes (4 quads).

The configuration registers 60A-60B may specify which lanes are configured into each possible port. That is, there may be a configuration register 60A-60B for each possible port. The configuration registers 60A-60B may identify lanes assigned to ports in any fashion. For example, in the illustrated embodiment, the configuration registers 60A-60B may include a start lane (SL) field and a size (Sz) field for each port. The start lane may be a lane number identifying an initial lane of one or more lanes configured to the port. The lane number may range for 0 to 23 in this embodiment, for the 24 lanes coupled to the 6 SERDES quads 62A-62B. Alternatively, each pipe may number the lanes from 0 to 15, for the 16 lanes to which that pipe is coupled. The size field may identify the number of lanes configured into the port, or the "width" of the port. For example, configurations of 1 lane, 2 lanes, 4 lanes, 8 lanes, or 16 lanes may be supported, generally referred to as x1, x2, x4, x8, and x16. The lanes that are configured into the port begin with the initial lane, and include neighboring lanes if the size is larger than one lane. The size field may be coded in any fashion. For example, the supported sizes may be encoded. Alternatively, a one hot bit field may indicate the size, or a mask with a number of bits equal to the width may be used. Still other embodiments may describe the ports in other fashions (e.g. start lane and end lane numbers, a list of lanes, etc.). In the illustrated embodiment, each receive pipe 50A-50B supports up to four ports. The configuration registers may also include an enable bit (not shown) indicating whether or not the port is enabled, or a disabled port may have a size of zero.

A port having multiple lanes may receive data on each lane in parallel (e.g. a byte may be received on each lane in parallel with bytes on other lanes). The lanes may not be synced, so "parallel" may generally refer to "at approximately the same time" in this context, where receipt of the parallel bytes on a pair of lanes may substantially overlap in time (e.g. more the 50% overlap). In one embodiment, the lowest-numbered lane may be considered to be the most significant byte, followed by higher numbered lanes in order of their numbering. PCIe supports a lane reversal, however, in which the highest-numbered lane is the most significant byte and bytes received in parallel are less significant bytes in reverse order of their numbers. A lane reversal bit (LR) for each port in the configuration registers 60A-60B may indicate whether or not a lane reversal is desired for the port (e.g. lane reversal if set, no lane reversal if clear, or vice versa). In other embodiments, lane reversal may be selected on a receive pipe basis or for the ports as a whole, and the lane reversal indication may be stored in a separation configuration register. Lane reversal may be determined by hardware, in some embodiments, and may or may not be stored in a configuration register.

The SERDES quad 62B illustrates that a PLL 66 is shared among the SERDES 64A-64D in the quad. The quad may comprise a "megacell" that can be instantiated in an integrated circuit design as a unit. The electrical characteristics of the quad may be specified and used to design other circuitry that interfaces to the quad. In general, such a megacell may include any number of two or more SERDES (e.g. more or fewer than 4), and one or more shared resources such as the PLL 66.

As used herein, lanes are considered to be "neighboring" if they are consecutive to each other in the lane number scheme. Neighboring lanes may be physically near each other, in some embodiments (e.g. lanes in the same SERDES quad 62A-62F may be neighboring). Similarly, groups of SERDES may be viewed as neighboring (e.g. neighboring SERDES quads 62A-62F, or neighboring groups of SERDES quads that can be ganged together to form a port.

In one embodiment, the peripheral interface controller 32 may support a flexible configuration of ports, but may limit the possible configurations to provide an efficient implementation of the receive pipes 50A-50B. In one embodiment, the following configurations are supported: (1) only port 0 may be configured as a x16 port; (2) only port 0 or port 2 may be configured as a x8 port; and (3) ports of any size are configured on neighboring lanes that begin on a natural size boundary for that size (e.g. x2 begins with an even-numbered lane, x4 begins on a four lane boundary so all lanes are in the same SERDES quad 62A-62F, x8 begins on an eight lane boundary, etc.).

The shared lanes (SERDES quads 62C-62D) should each only be configured to one port. In one embodiment, software is required to ensure that the configuration registers 60A-60B are programmed correctly so that each lane is included in at most one port. In other embodiments, hardware may detect that a given lane is programmed into two or more ports and interrupt the processor to change the configuration.

Using these rules, the receive pipes 50A-50B may employ a set of multiplexing levels, where each level comprises one or more multiplexors (muxes). Each mux at the first level is coupled to receive bytes from pairs of neighboring lanes. Specifically, a given mux may receive a pair of bytes in one order on one input of the given mux and may receive the pair connected in reverse order on the other input of the given mux. A given mux at other levels may similarly be coupled to receive the outputs of a pair of neighboring muxes from the next lower level, in one order on one input and in the reverse order on the other input. Neighboring muxes may output data from neighboring lanes. Control logic may generate select control signals for each level based on the start lane of each port, a counter indicating how many bytes have been accumulated at each port, and whether or not lane reversal is desired. Other embodiments may not implement lane reversal, and the control logic may generate the select control signals responsive to the counter and the start lane.

Figure 4:
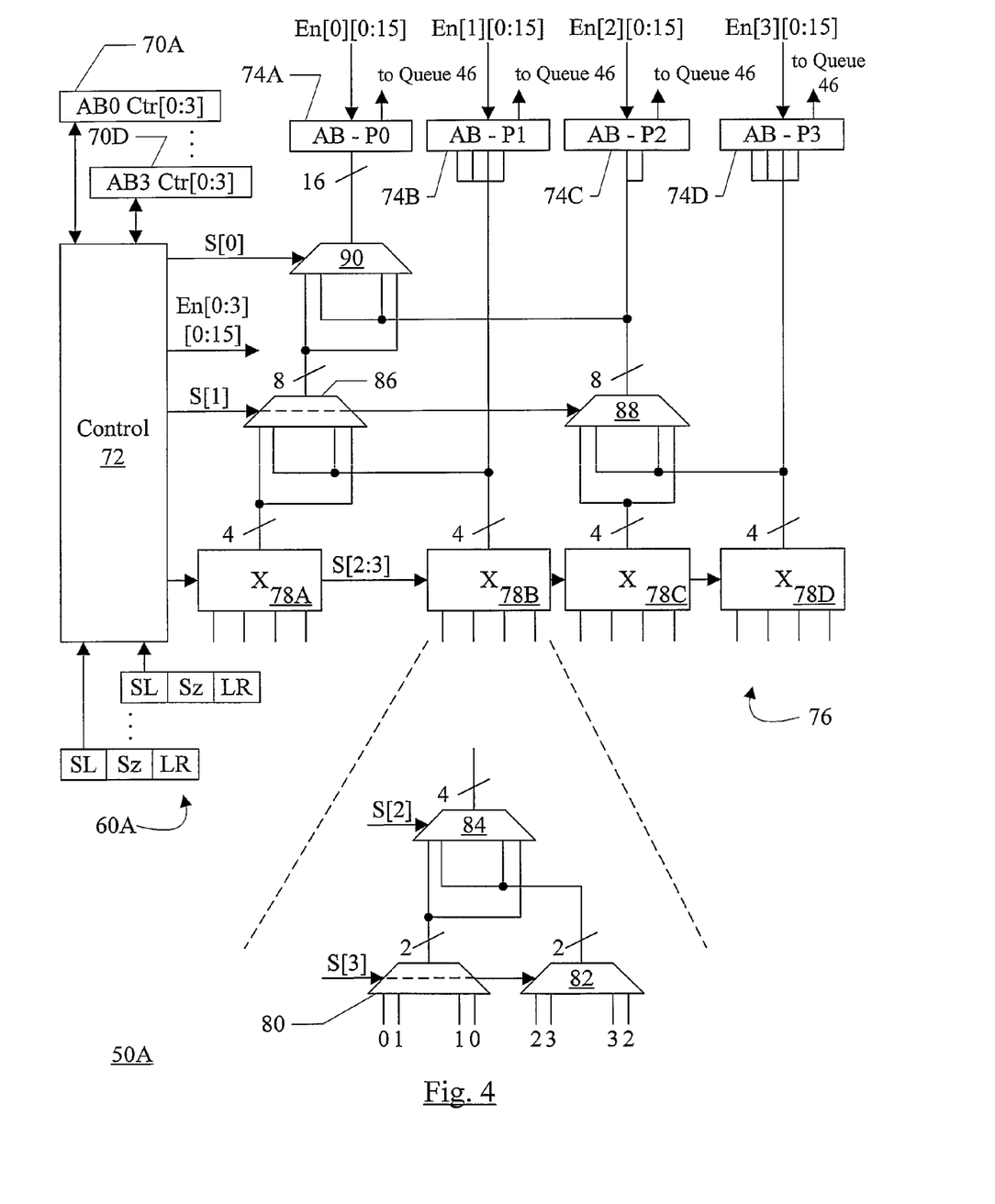
FIG. 4 is a block diagram of one embodiment of a receive pipeline shown in FIG. 3.

FIG. 4 is a block diagram illustrating the levels of muxing and corresponding control logic for one embodiment of the receive pipe 50A. The receive pipe 50B may be similar. Specifically, in the illustrated embodiment, there are four ports (P0 to P3) that may be configured on the lanes to which the receive pipe 50A is coupled. In the illustrated embodiment, a plurality of accumulate buffer counters 70A-70D (one per port) are coupled to a control unit 72, which is further coupled to the configuration registers 60A. The control unit 72 is coupled to provide a set of byte enables (En[0:3][0:15]). There are 16 byte enables for each port, corresponding to the 16 byte accumulate buffers 74A-74D, each of which is coupled to receive its corresponding byte enables from the control unit 72 and coupled to provide data to the receive command queue 46. The control unit 72 is also coupled to the mux levels 76, where each level comprises one or more muxes. Specifically, the control unit 72 is configured to generate mux control signals for each mux level (illustrated as S[0] to S[3] in FIG. 4). Each mux at a given level may have its own control signal, which may be generated based on which port(s) the lanes coupled to that mux can be configured to. For convenience in the drawing, one signal per level is shown. The lowest two levels are illustrated as switches 78A-78D, one per SERDES quad 62A-62D and receiving the bytes from that quad as inputs. The switch 78B is shown in exploded view, and the other switches 78A and 78C-78D may be similar. The switch 78B includes muxes 80 and 82, which are coupled to receive bytes lanes 0 and 1 (mux 80) and lanes 2 and 3 (mux 82) of the corresponding quad. Specifically, one input of mux 80 receives byte 0 followed by byte 1 on one input, and byte 1 followed by byte 0 on the other input (i.e. in reverse order from the order on the first input). Thus, depending on the mux select signal S[3], the output of the mux 80 is two bytes which is either byte 0 followed by byte 1 or vice versa. Similarly, mux 82 is coupled to receive bytes 2 and 3 in either order and to output two bytes. The mux 84 is coupled to receive the outputs of neighboring muxes 80 and 82, in both one order and the reverse order, and outputs a set of 4 bytes from one of the two inputs based on S[2]. The output of switches 78A-78B are coupled in both one order and the reverse as inputs to the mux 86, and the output of switches 78C-78D are coupled in both one order and the reverse as inputs to the mux 88. The outputs of the muxes 86 and 88 are coupled in one order and the reverse order as inputs to the mux 90, the output of which is coupled to the accumulate buffer 74A for port 0. The output of the switches 78B and 78D, respectively, are coupled to the accumulate buffers 74B and 74D for ports 1 and 3, respectively, and the output of the mux 88 is coupled to the accumulate buffer 74C. Particularly, the output of switches 78B and 78D are coupled four times (at different byte positions of the accumulate buffers 74B and 74D). Similarly, the output of mux 88 is coupled to the accumulate buffer 74C twice, at different byte positions.

The mux levels 76 may accommodate configurations of ports in x1, x2, x4, x8, and x16 configurations, where the x16 configuration is only permitted on port 0 and the x8 configuration is only permitted on port 0 or 2. Specifically, selecting various byte orderings through the mux levels 76 may align received bytes to the appropriate byte positions in the accumulate buffers 74A-74D, based on the number of bytes already received.

For example, a x1 port for port 1 can be configured on lane 1 of the quad corresponding to switch 78B. By alternately selecting the inputs of the mux 80 on consecutive received bytes, lane 1 can be byte 0 or byte 1 of the output of mux 80. Similarly, the mux select on mux 84 can be controlled to move the two bytes from mux 80 to either bytes 0 and 1 or bytes 2 and 3 output from the mux 84. The output of mux 84 is coupled at byte positions 0 to 3, 4 to 7, 8 to 11, and 12 to 15 of the accumulate buffer 78B, and by generating the correct byte enables based on the number of received bytes, the correct byte may be written to each byte position. Specifically, when the first byte is received on the port, the mux select S[3] may select lane order 10 (right input in FIG. 4), placing the byte from lane 1 in the byte 0 position output from the mux 80. The mux select S[2] may select the byte order 0123 (left input). Thus, lane 1 is still in byte 0 position. The enable bit 0 may be asserted, and the byte is written to byte position 0 of the accumulate buffer 74B. When the second byte is received, the mux select S[3] may select the lane order 01 (right input), and the select S[2] may select the right input of the mux 84 again. Thus, the lane 1 byte is in byte 1 position at the output of mux 84, and can be written to byte position 1 of the accumulate buffer 74B via assertion of the byte enable bit 1. When the third byte is received, the select S[3] again selects lane order 10 (right input in FIG. 4), placing the byte from lane 1 in the byte 0 position output from the mux 80. The mux select S[2] may select the byte order 2301 (right input). Thus, lane 1 is now byte position 2 at the output of mux 84. The enable may be generated for byte position 2, writing the third byte to the accumulate buffer 74B. When the fourth byte is received, the mux select S[3] may select the lane order 01 (right input), and the select S[2] may select the left input of the mux 84 again. Thus, the lane 1 byte is in byte position 3 output from the mux 84, and can be written to byte position 3 of the accumulate buffer 74B via assertion of the byte enable bit 3. The remaining 12 bytes may proceed in similar fashion to the first four, but the subsequent sets of byte enables 4 to 7, 8 to 11, and 12 to 15 may be asserted to fill the remainder of the accumulate buffer 74B.

A x2 port is similar to the above, but since a x2 port is configured on a natural 2 lane boundary (e.g. the start lane is either 0 or 2 in the quad), the mux selects for the muxes 80 and 82 remain constant (and two byte enables are asserted per reception of bytes). Similarly, a x4 port has constant mux selects on muxes 80, 82, and 84; etc.

The mux levels 76 may also handle lane reversal. In general, the mux selects for lane reversal at each level of muxing are the opposite of the same selects when lane reversal is not used. Accordingly, generation of the mux selects may include an exclusive OR of the lane reversal bit, for one embodiment.

Accordingly, for a given port, the following data may affect the mux selects for the next received byte(s): the number of bytes within the accumulate buffer that were previously received, the start lane for the port, the size of the port, and the lane reversal attribute of the port. In one embodiment, the control unit 72 may maintain accumulate buffer counters 70A-70D for each port, which may be incremented by the number of bytes received. In the illustrated embodiment, in which 16 byte accumulate buffers are implemented, the counters may each be 4 bits to represent the number of bytes received (and thus the position in the accumulate buffer to which the next byte or bytes are to be written). The counter may begin at zero, and may be incremented by the size of the port each time byte(s) are received and rolls over to zero when incremented to 16. Thus, for a x1 port, the counter is incremented by one; for a x2 port, the counter is incremented by two, etc. Each bit of the counter may factor into the mux selects for one level of muxing (e.g. bit 3 may factor into the mux select S[3], bit 2 may factor into mux select S[2], etc. In this fashion, the mux select S[3] may be held constant based on start lane and lane reversal attributes for any port other than x1, since bit 3 of the counter is always zero in such cases. Similarly, S[2] may be held constant for any port other than x1 or x2, etc.

The byte enables for the accumulate buffer may be based on the accumulate buffer counter and size. Specifically, the enable for the byte position indicated by the accumulate buffer may be asserted, as well as one or more neighboring enables on the increasing byte position side if more than one lane is configured for the port (e.g. 2 byte enables total for a x2 configuration, 4 byte enables total for a x4 configuration, etc.)

As mentioned previously, in the present embodiment, only port 0 may be used for the x16 port configuration. Accordingly, only mux 90 is implemented at the top level of muxing in FIG. 4, to generate 16 bytes for accumulate buffer 74A. If another port were selected to be the only port on which a x16 configuration is supported, the output of the mux 90 may be coupled to that port's accumulate buffer 74A-74D. If more than one port were supported for a x16 configuration, additional muxes similar to the mux 90 could be provided.

Similarly, since a x8 configuration is supported only on port 0 or port 2, only muxes 86 and 88 are provided at the next lower level of muxing (connected to ports 0 and 2, respectively, wherein the mux 86 is connected to port 0 through the mux 90).

The configuration illustrated in FIG. 4 supports a x1, x2, or x4 configuration from any quad on port 0; a x1, x2, or x4 configuration from the switch 78B (quad 62B) on port 1; a x1, x2, or x4 configuration from either switch 78C or switch 78D (quads 62C and 62D) on port 2; and a x1, x2, or x4 configuration from switch 78D (quad 62D) on port 3. To provide additional flexibility for x1, x2, or x4 configurations, additional switches similar to switches 78A-78D and/or additional muxes similar to muxes 86-88 may be provided. For example, port 1 may support a x1, x2, or x4 configuration on quad 62A by adding and additional switch similar to switch 78A, with the output coupled with the output of switch 78B as inputs to another mux that statically selects between the two switches based on the port configuration. The output of such a mux would be connected four times (at different byte positions) to the input of the accumulate buffer 74B. Port 1 may support a x1, x2, or x4 configuration from any quad by adding four additional switches similar to switches 78A-78D, respectively, and a mux or muxes similar to statically select between them based on the port configuration. Similar expansions may be made for other ports.

Such additional flexibility may be desirable for several reasons. For example, if not all 16 lanes are in use for a configuration, grouping the ports in as few quads as possible may permit power savings by powering down the unused quads. For example, the PLLs in the unused quads may be powered down. Thus, if 4 x1 ports are configured, and all 4 x1 ports are in the same quad, the other 3 quads may be powered down (unless the shared quads are used by the other receive pipeline).

It is noted that, while configuration registers are used to indicate various port configurations, other mechanisms may be used (e.g. external pin ties, fuses, etc.). It is further noted that the select signals for each mux at the same level may not be the same signal. For example, a different S[3] select signal may be provided to each mux 80 or 82 in each switch 78A-78D. Each mux select S[3] signal may be generated based on port configuration and accumulate buffer counter for the port that includes the lanes input to that multiplexor.

Figure 5:
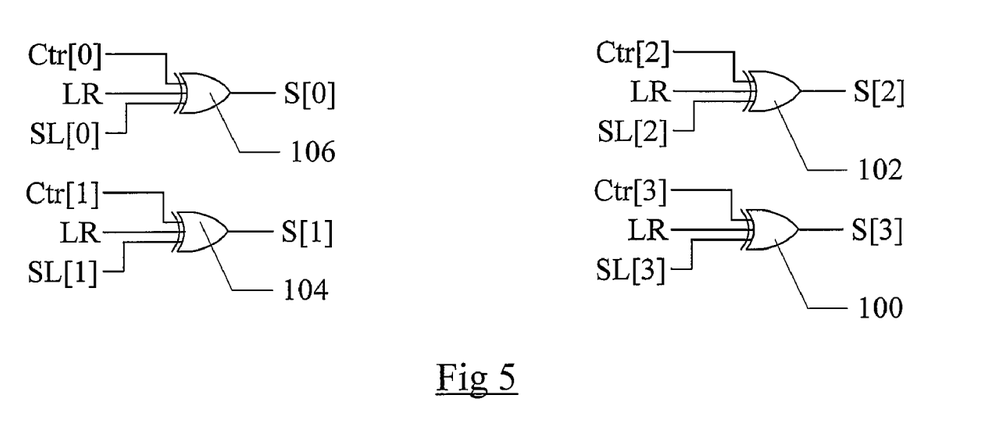
FIG. 5 is a logic diagram illustrating one embodiment of selection control signal generation logic.

FIG. 5 is a logic diagram illustrating the generation of select signals S[0:3] in general, for one embodiment. While specific logic gates are shown in FIG. 5, any logic may be used, including any Boolean equivalents of the logic shown.

As illustrated in FIG. 5, each level of muxing may have its mux selects generated based on a respective bit of the start lane (SL) of the port, the lane reversal attribute (LR) of the port, and the respective bit of the accumulate buffer counter (Ctr) of the port. That is, the lowest level of muxing (muxes 80 and 82 in FIG. 4) may have mux selects generated from the least significant bit of the start lane (SL[3]), the least significant bit of the accumulate buffer counter (Ctr[3]), and the lane reversal attribute (LR), as illustrated by exclusive OR (XOR) gate 100. The next level of muxing (e.g. mux 84) may have mux selects generated from the next least significant bit of the start lane (SL[2]), the next least significant bit of the accumulate buffer counter (Ctr[2]), and LR, as illustrated by XOR gate 102. The selects for muxes 86 and 88 may be generated based on SL[1], Ctr[1], and LR (XOR gate 104); and the select for mux 90 may be generated based on the most significant bits SL[0] and Ctr[0], and LR (XOR gate 106).

The start lane gives an initial setting for the select, ensuring that the initial bytes received on the lane(s) configured into the port are aligned to byte 0 (and neighboring bytes, for larger ports) of the accumulate buffer 74A-74D for that port. The initial selection can be inverted if lane reversal is selected. The lane reversal and start lane are constant for a given port configuration. Accordingly, mux selects change as the accumulate buffer counter is incremented (as bytes are received). For larger ports, the mux selects for the lower level muxes (e.g. S[3], S[2], etc.) may remain constant and generally are routing together the bytes from the lanes allocated to the port (and aligning the lanes based on the lane reversal attribute of the port). The muxes at the higher levels and/or the byte enables generated to the accumulate buffers complete the alignment of the lanes to the correct byte positions and the capture of the received bytes into the accumulate buffer positions. Once the accumulate buffer is filled, its contents are written to the receive command queue 46.

For example, a x1 configuration for port 0 includes incrementing the accumulate buffer counter by one for each clock that a byte is received. Accordingly, the select S[3] changes state each receive cycle to shift the byte from the lane by a position. S[2] changes state each other receive cycle, shifting the byte back and forth by two byte positions; S[1] changes state each fourth receive cycle, shifting the byte back and forth by four byte positions; and S[0] changes state each eighth receiving cycle, shifting the byte back and forth by eight byte positions. Accordingly, the byte from the lane configured onto port 0 is provided as an input at each byte position of the accumulate buffer 74A, and can be written to that byte position by asserting the byte enable for that position.

A x2 configuration for port 0 includes incrementing the accumulate buffer by two for each clock that the bytes are received. Accordingly, S[3] remains constant, selecting the 01 or 23 byte order if lane reversal is not in effect or the 10 or 32 order if lane reversal is in effect, based on whether the start lane is lane 0 or lane 2 of the quad. S[2] changes state each receive cycle, shifting the two bytes back and forth by two byte positions; S[1] changes state each other receive cycle, shifting the two bytes back and forth by four byte positions; and S[0] changes state each fourth receiving cycle, shifting the byte back and forth by eight byte positions. Accordingly, the two bytes from the two lanes configured onto port 0 are provided as an input at each set of two byte positions of the accumulate buffer 74A, and can be written to those byte position by asserting the byte enables for those positions. The x4 and x8 configurations work similarly, with additional selects being constant based on the size.

It is noted that the SL, Ctr, and LR inputs to the gates 100-106 in FIG. 4 do not include port indications. The port from which the start lane, lane reversal, and accumulate buffer counter bits are drawn for generating a given select signal for a given mux depends on the port configurations as a whole. That is, if the mux is steering bytes to port 0 according to the port configuration, port 0 values are used. If the mux is steering bytes to port 1, port 1 values are used, etc. Thus, the control logic 72 may include logic similar to that shown in FIG. 5, and logic that selects or generates the inputs to the logic shown based on the port configurations.

It is noted that, while there are 4 levels of muxing in the embodiment illustrated in FIGS. 4 and 5, other embodiments may have fewer levels or more levels, based on the supported port widths of various embodiments. If lane reversal is not supported, the lane reversal input may be deleted from the illustrated embodiments.

Figure 6:
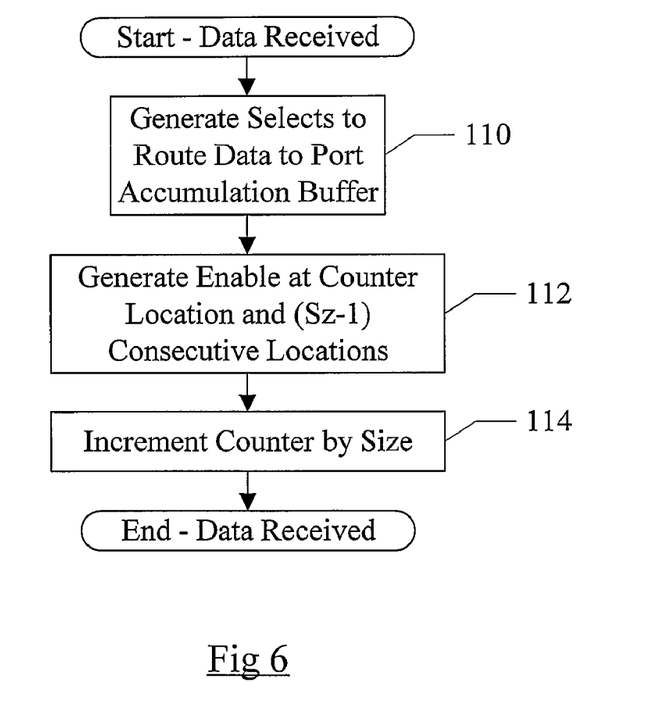
FIG. 6 is a flowchart illustrating operation of one embodiment of a receive pipeline in response to receiving data.

Turning now to FIG. 6, a flowchart is shown illustrating operation of one embodiment of the receive pipe 50A (and more particularly, the control logic 72 shown in FIG. 4) in response to receiving data on one or more lanes that are configured into a port. Operation of the receive pipe 50B may be similar, in parallel and independent of the receive pipe 50A. The receive pipe 50A may operate as shown in FIG. 6 in parallel for each port that is enabled during operation. While the blocks are shown in a particular order for ease of understanding, other orders may be used. Blocks may be performed in parallel in combinatorial logic in the receive pipe 50A. Blocks, combinations of blocks, and/or the flowchart as a whole may be pipelined over multiple clock cycles (pipeline storage devices are not shown in FIG. 4, but could be implemented as desired to pipeline operation, in various embodiments).

The receive pipe 50A may generate the mux selects for each mux level to route the bytes from the configured lane to the port's accumulation buffer (and more particularly, to the correct byte positions input to the accumulation buffer, based on the number of bytes already received on the port) (block 110). The receive pipe 50A may further generate the byte enables to enable writing of the byte indicated by the accumulation buffer counter for the port, and to enable writing of the next (Sz-1) consecutive bytes. For example, the byte enables corresponding to the bytes to be written may be asserted, and the remaining bytes enables may be deasserted, in one embodiment (block 112). The receive pipe 50A may also increment the accumulation buffer counter for the port by the number of bytes received (block 114).

Transmit Pipes

Figure 7:
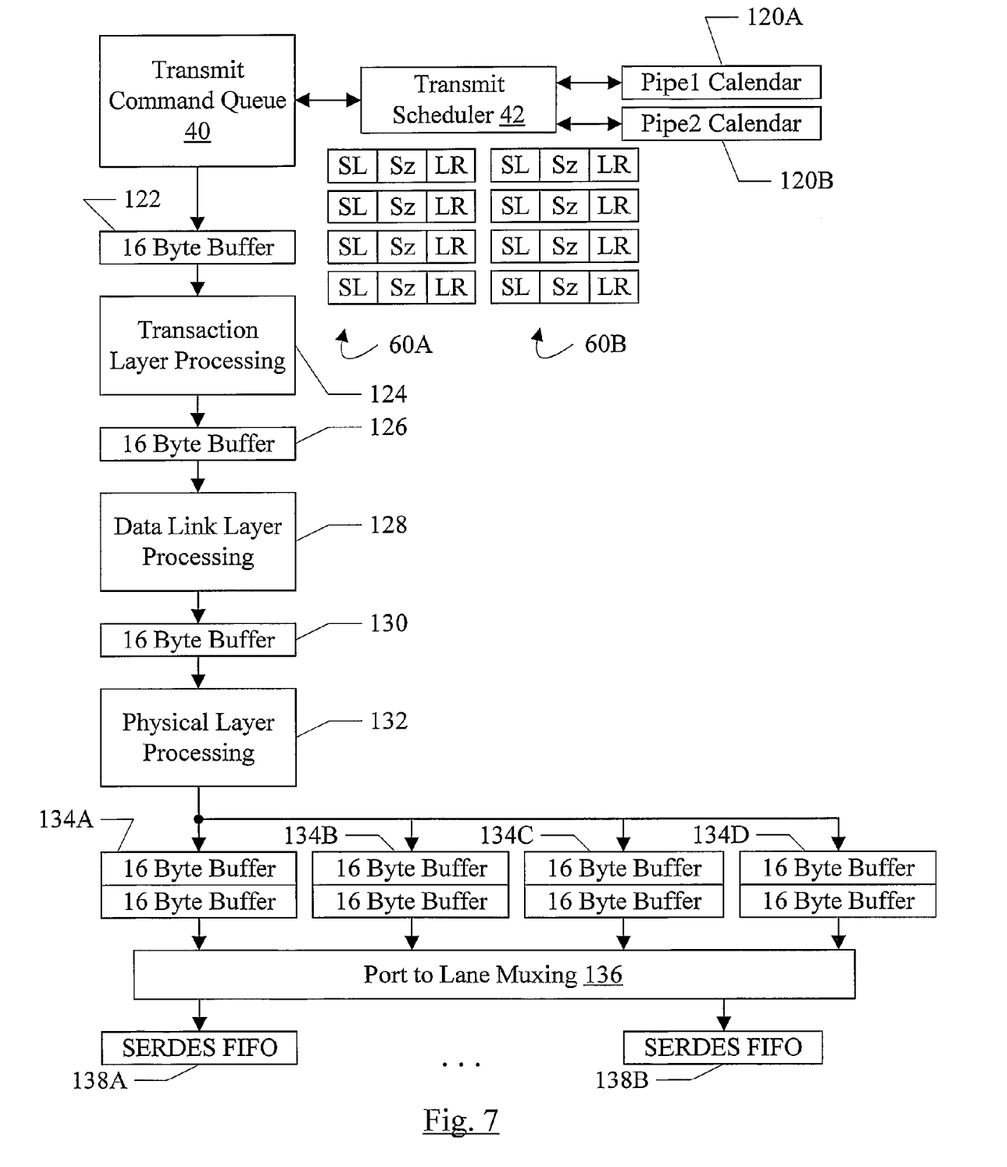
FIG. 7 is a block diagram of one embodiment of a transmit pipeline illustrated in FIG. 2.

Turning next to FIG. 7, a block diagram of one embodiment of the transmit pipe 44A is shown in more detail, along with the transmit command queue 40, the transmit scheduler 42, the configuration registers 60A-60B, a scheduling calendar 120A for the transmit command pipe 44A and a scheduling calendar 120B for the transmit command pipe 44B. The transmit pipe 44B may be similar to the transmit pipe 44A. The transmit command queue 40 is coupled to the transmit scheduler 42, which is coupled to the scheduling calendars 120A-120B and the configuration registers 60A-60B. The scheduling calendars 120A-120B may comprise any semiconductor storage (e.g. one or more registers, flops, other clocked storage devices, or memory). In the embodiment of FIG. 7, the transmit pipe 44A comprises a buffer 122, transaction layer processing logic 124, a buffer 126, data link layer processing logic 128, a buffer 130, physical layer processing 132, pairs of buffers 134A-134D (one pair per port), port to lane muxing circuitry 136, and a set of SERDES FIFOs including FIFOs 138A and 138B. There may be one SERDES FIFO 138 per SERDES in the SERDES circuits 52 (e.g. 24 FIFOs 138, in one embodiment). The transmit command queue 40 is coupled to the buffer 122, which is coupled to the transaction layer processing logic 124. The transaction layer processing logic 124 is coupled to the buffer 126, which is further coupled to the data link layer processing logic 128. The data link layer processing logic 128 is coupled to the buffer 130, which is coupled to the physical layer processing logic 132. The physical layer processing logic 132 is coupled to the pairs of buffers 134A-134D, which is coupled to the port to lane muxing circuitry 136, which is still further coupled to the SERDES FIFOs 138A-138B.

The transmit pipe 44A may generally comprise the circuitry that processes packet data from the user level to ready for transmission at the physical level. In PCIe, the processing may comprise transaction layer processing, data link layer processing, and physical layer processing, as shown in FIG. 7. Other interfaces may specify other processing.

The transmit pipe 44A uses less storage in the pipe than would be used for store and forward processing, in one embodiment. With store and forward processing, the entire packet is provided to a pipeline stage before being processed and thus each pipe stage must have storage for the maximum-sized PCIe packet. The transmit pipe 44A, on the other hand, uses a "maximum bandwidth unit" for pipeline processing. Specifically, the maximum bandwidth unit is the unit of data that is the largest datum that can be transmitted in one transmission on the lanes coupled to the pipeline. Thus, in this embodiment, the maximum bandwidth of the transmit pipe 44A is 16 bytes (a x16 link on the 16 lanes). By using less storage in the pipeline, the area consumed by the pipeline may be relatively small and thus the implementation may be efficient. Additionally, low latency may be achieved since a maximum bandwidth unit from a particular packet may be transmitted before subsequent maximum bandwidth units have even arrived in the transmit command queue 46. Other embodiments may have larger or smaller maximum bandwidth units, dependent on the lanes that are available to the pipeline in a given design. The maximum bandwidth unit is smaller than the largest PCIe packet size, and may be significant smaller in some embodiments.

In some configurations, the maximum bandwidth unit may be consumed each clock cycle (e.g. in a x16 configuration, 4 ports in x4 configurations, etc.). Accordingly, to supply enough maximum bandwidth units to avoid wasting transmissions on the lanes, an accurate transmit scheduler 42 is desired. In this embodiment, calendar-based scheduling is provided. In general, a scheduling calendar may comprise a plurality of slots. Each slot can be filled with an identifier to indicate which of multiple schedulable items is to be scheduled at that slot. For example, in this embodiment, up to four ports are to be scheduled and the calendar slots may be filled with port identifiers. The number of slots assigned to each port may be proportional to the port width. For example, a x16 port consumes data at a rate of 16 lanes (bytes) per transmission. A x1 port consumes data at a rate 16 times slower than the x16 port. A x2 port consumes data at a rate that is 8 times slower than the x16 port, etc. Accordingly, if a maximum bandwidth unit is scheduled to a x1 port, it takes 16 times longer to transmit the unit on the single lane of the port than a x16 port takes on its 16 lanes. Accordingly, the transmit scheduler 42 may fill the scheduling calendar 120A based on the configured port sizes. The calendar slots may be filled to approximately evenly distribute the slots for each port over the calendar (e.g. the distance between consecutive slots assigned to the same port may be approximately equal for each pair of consecutive slots). The transmit scheduler 42 may maintain a pointer to the calendar slots. The calendar slot indicated by the pointer is the current calendar slot. During a scheduling cycle, the transmit scheduler 42 may attempt to schedule a maximum bandwidth unit from the port indicated by the current calendar slot. Independent of whether or not scheduling is successful the transmit scheduler 42 may update the pointer to the next calendar slot.

The number of calendar slots may be, at a minimum, equal to the ratio between the largest possible port and the smallest possible port (e.g. 16 entries, for x16 as the largest and x1 as the smallest). Such a calendar provides at least enough calendar slots to provide the difference in scheduling between the largest and smallest port sizes. The calendar can also be any multiple of the minimum number of slots as well.

The transmit pipe 44A comprises shared resources that may be used by the maximum bandwidth units across the four ports that may be configured for one pipe. The shared resources may vary from embodiment to embodiment, but comprises the transaction layer, data link layer, and physical layer processing in the illustrated embodiment. A given maximum bandwidth unit from any port may be adjacent to a maximum bandwidth unit from another port in the pipeline (e.g. one port may have a maximum bandwidth unit in buffer 122, another port may concurrently have a maximum bandwidth unit in buffer 126, and still another port may concurrently have a maximum bandwidth unit in buffer 130.

The transmit pipe 44A may comprise a pair of maximum-bandwidth-unit-sized buffers for each port at the end of the pipeline, awaiting transmission to the SERDES. Specifically, there may be a SERDES FIFO 138A-138B for each SERDES, which may be used to handle the clock domain crossing to the SERDES. The FIFO may occasionally fill (e.g. if the SERDES clock is somewhat slower than the clock for the transmit pipe 44A), and the second buffer in the pair may be used to store the maximum bandwidth unit temporarily until the full condition clears.

The port to lane muxing circuitry 136 may be similar to the muxing levels in the receive pipes 50A-50B, except that the bytes are being routed from ports out to lanes rather than the other direction. Accordingly, byte positions from the buffers 134A-134D may be selected based on the number of bytes transmitted and the size of the port, and the selected bytes may be routed to the configured lanes. The muxing levels may thus be somewhat the reverse of the muxing structure shown in FIG. 4. Similar control logic may generate mux selects based on the start lane configuration, the lane reversal configuration, and a counter that counts bytes of the maximum bandwidth units that have been transmitted.

Figure 8:
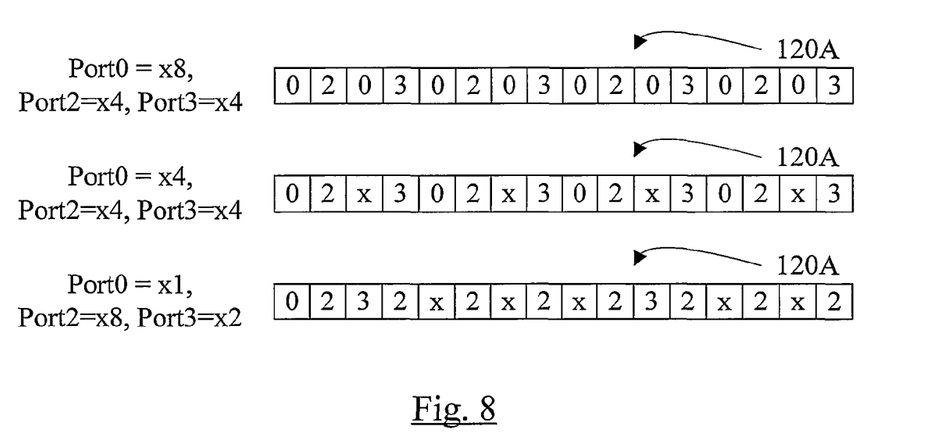
FIG. 8 is an example of a scheduling calendar.

FIG. 8 is a block diagram of various examples of port configurations and how the scheduling calendar 120A may be filled for the configurations. In the first example, port 0 is a x8 port, and ports 2 and 3 are each x4 ports. Accordingly, this configuration is capable of consuming maximum bandwidth units essentially continuously (all lanes are in use), and the scheduling calendar 120A is filled. Port 0 has every other calendar slot, since it is x8 and thus may consume maximum bandwidth units at ½ the rate of a x16 port. Ports 2 and 3 have every fourth slot, as shown.

In the second example, port 0, 2, and 3 are each x4. Accordingly, each port is assigned every fourth calendar slot. Since only 12 total calendar slots are used, 4 calendar slots are don't cares (indicated by "x" in the example) and no scheduling occurs for those slots.

In the third example, port 0 is x1, port 2 is x8, and port 3 is x2. Accordingly, port 1 is assigned one scheduling slot, port 2 every other scheduling slot, and port 3 is assigned 2 scheduling slots. One scheduling configuration that meets these parameters is shown in FIG. 8.

Figure 9:
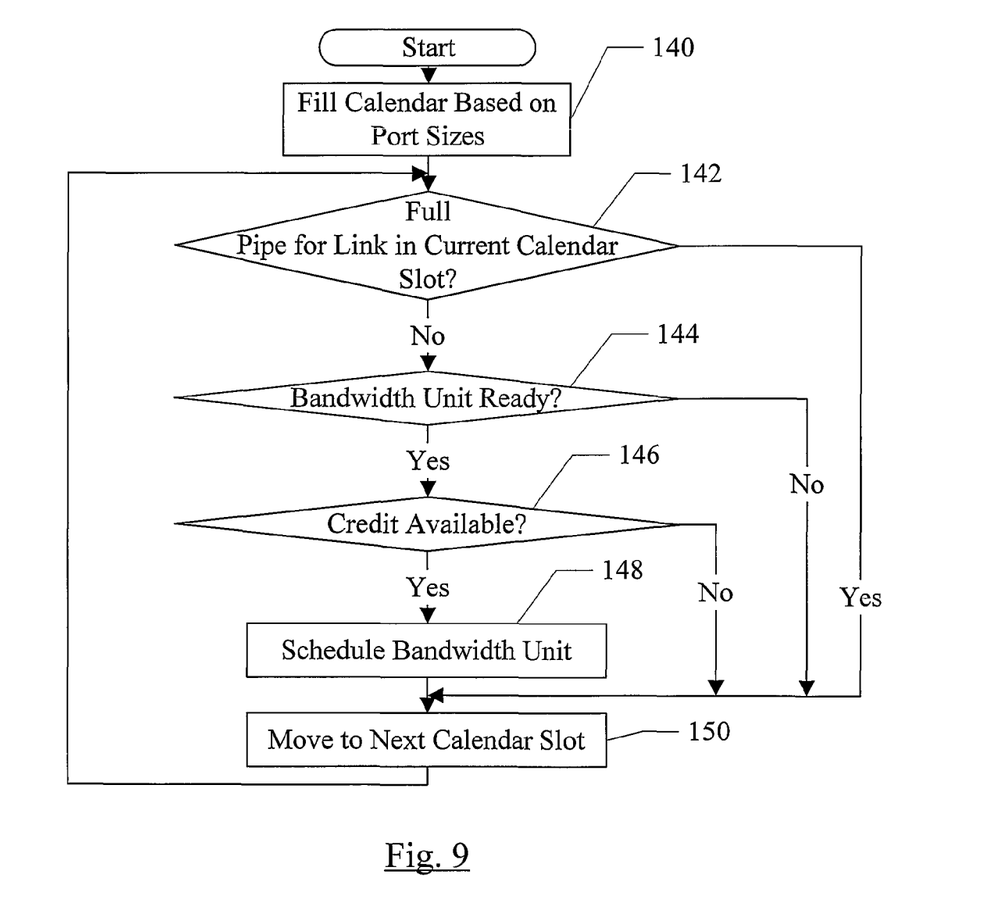
FIG. 9 is a flowchart illustrating operation of one embodiment of a transmit scheduler using the transmit calendar.

FIG. 9 is a flowchart illustrating operation of one embodiment of the transmit scheduler 42 to schedule maximum bandwidth units for the transmit pipe 44A. The transmit scheduler 42 may have similar operation, in parallel and independently, for the transmit pipe 44B. While the blocks are shown in a particular order for ease of understanding, other orders may be used. Blocks may be performed in parallel in combinatorial logic in the transmit scheduler 42. Blocks, combinations of blocks, and/or the flowchart as a whole may be pipelined over multiple clock cycles.

Once the ports have been configured, the transmit scheduler 42 may fill the scheduling calendar 120A based on the configured port sizes (block 140). Alternatively, the scheduling calendar 120A may be filled by the configuration software that configures the ports. The transmit scheduler 42 may then attempt to schedule maximum bandwidth units to the ports. Several factors may be considered in determining if the pipe is able to accept another maximum bandwidth unit for the port indicated in the current calendar slot (decision block 132). For example, the following factors may be considered: (i) whether or not one or more SERDES FIFOs corresponding to the port have recently (e.g. in the last few clock cycles) indicated full; (ii) whether or not the double buffer for the port is full, storing one maximum bandwidth unit, or empty; (iii) the number of previously scheduled maximum bandwidth units that are in the pipeline and have not yet reached the double buffer. If the pipe is not able to accept another maximum bandwidth unit (the pipe is "full"—decision block 142, "yes" leg), then the transmit scheduler 42 may not schedule a maximum bandwidth unit this clock cycle and may move to the next calendar slot (block 150). If no bandwidth unit is ready for scheduling in the port (decision block 144, "no" leg) or there are no credits available for the bandwidth unit at the receiving device on the lane(s) (decision block 146, "no" leg), the transmit scheduler 42 may similarly skip scheduling for this scheduling cycle and move to the next calendar slot (block 150). On the other hand, if the pipe is not "full" (decision block 142, "no" leg), a maximum bandwidth unit is ready for scheduling in the port, (decision block 144, "yes" leg), and a credit is available (decision block 146, "yes" leg), the transmit scheduler 42 may schedule a maximum bandwidth unit on the port (block 148) and may move to the next calendar slot (block 150). Scheduling the maximum bandwidth unit (block 148) may include signalling the transmit command queue 40 to indicate which maximum bandwidth unit is to be transmitted.

Various factors may affect whether or not a bandwidth unit is available for scheduling. First, at least one maximum bandwidth unit for the port may be in the scheduler for a maximum bandwidth unit to be ready for scheduling. Additionally, the packet that the maximum bandwidth unit is part of may be available to be scheduled (e.g. according to various ordering rules with other packets on the same port) for the maximum bandwidth unit to be available.

Credits may be managed on a maximum bandwidth unit basis, or on another basis (e.g. packet basis). If the credits are managed on another basis, determining that a credit is available at the receiver may include determining if the available maximum bandwidth unit is part of a packet to which a credit is already assigned to be consumed, and other maximum bandwidth units have already been transmitted that partially consume the credit.

Numerous variations and modifications will become apparent to those skilled in the art once the above disclosure is fully appreciated. It is intended that the following claims be interpreted to embrace all such variations and modifications.

What is claimed is:

1. A system comprising:
a physical transmission circuit configured to couple to a plurality of lanes and to transmit and receive on the plurality of lanes, wherein each lane supports serial communication during use;
a peripheral interface controller coupled to the physical transmission circuit, wherein the peripheral interface controller is programmable during use to implement a plurality of peripheral interface ports over the plurality of lanes, each port of the plurality of interface ports having a width which is a number of the plurality of lanes over which that port is configured, and wherein the peripheral interface controller supports a plurality of port widths up to a maximum port width, wherein the maximum port width is a largest port width of the plurality of port widths, and wherein a maximum bandwidth unit is an amount of data equal to the maximum port width, and wherein the peripheral interface controller is coupled to receive packets to be transmitted on peripheral interface ports, and wherein the peripheral interface unit comprises a queue configured to store the packets to be transmitted and a first transmit pipe coupled to the queue, wherein the first transmit pipe is configured to process packet data for transmission to the physical transmission circuit, and wherein the first transmit pipe comprises a plurality of stages, and wherein each of the plurality of stages is configured to process a maximum bandwidth unit per clock cycle, and wherein the peripheral interface controller is configured to transmit a maximum bandwidth unit into the first transmit pipe even in the case that a first port on which the maximum bandwidth unit is to be transmitted has a first width that is less than the maximum width, and wherein the peripheral interconnect controller further comprises a scheduling calendar for the first transmit pipe, wherein the peripheral interconnect controller is configured to schedule maximum bandwidth units for the plurality of ports responsive to the scheduling calendar, and wherein the peripheral interface controller comprises a second transmit pipe, wherein the peripheral interface controller is further programmable during use to implement a second plurality of peripheral interface ports over the plurality of lanes, and wherein the queue is further configured to store packets to be transmitted on the second plurality of ports, and wherein the peripheral interface controller is configured to transmit maximum bandwidth units to be communicated on the second plurality of ports to the second transmit pipe, and wherein the second transmit pipe comprises a plurality of stages configured to process the maximum bandwidth unit per clock cycle, and wherein the scheduling calendar includes independent calendars for each of the transmit pipe and the second transmit pipe, wherein the scheduling calendar comprises a number of calendar slots equal to a ratio between a largest possible port width and a smallest possible port width for each respective transmit pipe.

2. The system as recited in claim 1 further comprising a bridge coupled to the peripheral interface controller; an interconnect coupled to the bridge; one or more processors coupled to the interconnect; and one or more memory controllers coupled to the interconnect and configured to control memory devices to store data and instructions for use by the processor; wherein the processor is configured to generate commands to be transmitted in packets by the peripheral interface controller, the processor generating the commands responsive to executing the instructions.

* * * * *